United States Patent Office 3,844,983
Patented Oct. 29, 1974

3,844,983
ROOM TEMPERATURE CURING POLY(FLUORO-ALKOXYPHOSPHAZENE) COPOLYMERS AND TERPOLYMERS
Kennard A. Reynard, Mentor, and Selwyn H. Rose, Beachwood, Ohio, assignors to Horizons Incorporated, a Division of Horizons Research Incorporated
No Drawing. Continuation-in-part of application Ser. No. 33,871, May 1, 1970, now Patent No. 3,702,833. This application Nov. 2, 1972, Ser. No. 303,187
Int. Cl. C08d; C08g
U.S. Cl. 260—2 P          9 Claims

ABSTRACT OF THE DISCLOSURE

Improved P-N polymers in which at least some of the organic radicals attached to the P atom contain —NH functionality whereby the properties and the polymer may be modified by crosslinking and/or curing.

---

This application is a continuation-in-part of U.S. Patent application Ser. No. 33,871, filed May 1, 1970 and issued as U.S. Pat. 3,702,833.

This invention relates to polymers containing repeating

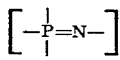

units in the polymer chain. More particularly it relates to polyphosphazene copolymers and terpolymers which contain —NH functionality attached to an organic radical which is bonded to phosphorus.

The invention is applicable to the polyphosphazene homopolymers described in U.S. Pat. 3,370,020 (Allcock et al.) issued Feb. 20, 1968, and in Polymer, *11*, 31 (1970), to the poly(fluoroalkoxyphosphazene) elastomers described in U.S. Pat. 3,515,688 (Rose) issued June 2, 1970, to the polyphosphazene copolymers and terpolymers described in U.S. Pats. 3,702,833 and 3,700,629, and Polymer, *13*, 253 (1972), and to other polymers characterized by a repeating sequence of

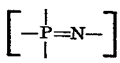

units in which various groups are attached to the P atoms via an oxygen atom, such groups including alkoxy, fluoroalkoxy, aryloxy, substituted aryloxy, and other groups. Suitable substituents on the phenoxy ring include halogen, nitro, cyano, phenyl, phenoxy and alkoxy. Other homopolymers and copolymers to which this invention is applicable are described in Chem. Rev., *72*, 315 et seq. (1972).

The poly(fluoroalkoxyphosphazene) copolymers of U.S. Pat. 3,515,688 and the terpolymers of U.S. Pat. 3,702,833 are capable of being crosslinked. However, cures which involved radical formation generally at elevated temperatures were employed. In contrast, the polymers of this invention can be crosslinked at room temperature without the necessity of a free radical source. By incorporation of a reactive —NH site as described herein, a controlled cure of these compositions is possible.

The polymers described in the prior art had structures of the type:

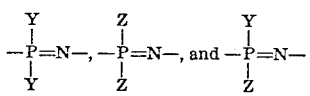

where Y is the same as Z for homopolymers but not for copolymers, and Y and Z are selected from alkoxy, substituted alkoxy, aryloxy, substituted aryloxy and arylalkoxy. Furthermore, these groups generally are thought to have a nonregular order in copolymers.

The polymers of this invention contain small amounts of randomly distributed repeating units in addition to the repeating units described above. The polymers of this invention have a degree of polymerization of 10 to 50,000. Examples of the additional repeating units are:

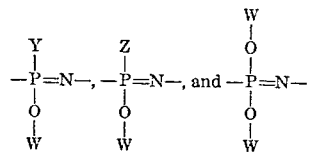

wherein Y and Z are defined as described above and W represents an organic monovalent radical containing a group with —NH functionality which is capable of further reaction at relatively moderate temperatures and the (Y+Z):W ratio is from 99.5/0.5 to 65/35. These groups are capable of further reaction at moderate temperatures in the presence of many reagents, often even in the absence of accelerators. Examples of W are:

—CH$_2$CH$_2$NCH$_3$, —CH$_2$CH$_2$NC$_2$H$_5$, —CH$_2$CH$_2$CH$_2$NCH$_3$,
     |             |                   |
     H            H                   H

—CH$_2$CH$_2$CH$_2$NC$_2$H$_5$, —CH$_2$CHCH$_3$, —CH$_2$CHC$_2$H$_5$,
         |              |               |
         H             NH$_2$       NH$_2$

—CH$_2$(CH$_2$)$_x$NH$_2$, —CH$_2$CH$_2$NCH$_2$CH$_2$NHCH$_2$CH$_2$,

—CH$_2$CH$_2$CHCH$_2$CH$_2$NHCH$_2$CH$_2$, —C$_6$H$_4$CH$_2$NH$_2$ (*m* or *p*),

—C$_6$H$_4$CH$_2$CH$_2$NH$_2$ (*m* or *p*), —CH$_2$C$_6$H$_4$NH$_2$ (*m* or *p*),

—CH$_2$CH$_2$C$_6$H$_4$NH$_2$ (*m* or *p*), —C$_6$H$_3$-3-CH$_3$-4-NH$_2$, where *x* is an integer from 1 to 4.

The ratio of (Y+Z) groups to W groups is from about 99.5/0.5 up to 65/35. Low molecular weight polymers require higher concentrations of W groups for subsequent crosslinking whereas high molecular weight polymers require much smaller concentrations.

Thus W in the above formulae is a monovalent group in which a reactive —NH or —NH$_2$ group is present, W being represented generically by any of the following:

(a)

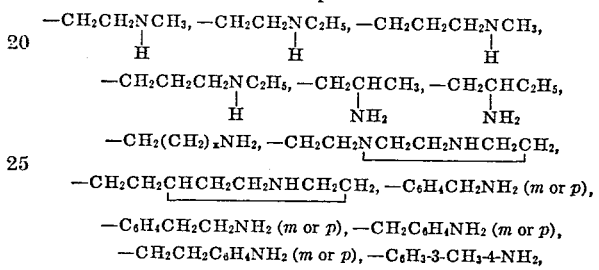

R' is —(CH$_2$)$_a$—, —C$_6$H$_4$(CH$_2$)$_a$—,
a=1 to 4
R" is lower alkyl (C$_1$ to C$_4$)

(b)

—R'''—NH$_2$   R''' is aryl, alkyl, aralkyl, alkylaryl, and the aryl group may be carbocyclic or heterocyclic (c)

—R''''⟩NH   R'''' is the atoms necessary to complete a heterocyclic ring

These groups are capable of further reaction at moderate temperatures in the presence of compounds which effect crosslinking. The presence of a catalyst to achieve a cure is often desirable.

Optimization of physical and chemical properties of the polymers of this invention is achieved by crosslinking reactions. When crosslinked, the polymers of this invention are useful as solvent and chemically resistant coatings, sealants, potting compounds, elastomers and plastics. Said polymers contain amino sites and can be crosslinked by a variety of chemical agents such as those that contain at least two isocyanate, anhydride, or epoxy sites per molecule.

The polymers of the present invention are prepared by reaction of poly(dichlorophosphazene), a single alkali metal salt of an alcohol, or a mixture of alkali metal salts of two different alcohols, and a quantity of a third alkali metal salt of an alcohol which also contains —NH$_2$, —NH, or —N(R")H moieties, or groups capable of subsequent reactions to form these moieties. The total mole percent of salts used is between 105 and 200% based on equivalents of chlorine present in the poly(dichlorophosphazene). For example, purified [Cl$_2$PN]$_n$ polymer or polymer mixture in a suitable solvent such as benzene, toluene, xylene, chlorobenzene, 1,2-dichlorobenzene, tetrahydrofuran or mixtures thereof was reacted with $NaOCH_2CF_3$, $NaOCH_2C_3F_7$ and $NaOC_6H_4NH_2$ in the mole ratio 1:1:0.2. The polymer solution was gradually added to a well stirred solution or suspension of the alkoxide salts. The salts can also be added to the solution of poly(dichlorophosphazene). Sodium salts are normally employed but lithium or potassium salts are also suitable. This terpolymer cured at room temperature on treatment with phenyl diisocyanate. This same terpolymer was prepared by substitution of

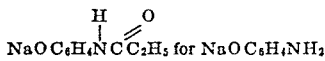

above, followed by hydrolysis of the resulting terpolymer. The terpolymer was cured with phenyl diisocyanate.

The alkali salts derived from trifluoroethanol, 2,2,3,3,3-pentafluoropropanol, 2,2,3,3,4,4,4 - heptafluorobutanol, 2,2,3,3 - tetrafluoropropanol, 2,2,3,3,4,4,5,5 - octafluoropentanol, 2,2,3,3,4,4,5,5,6,6,7,7 - dodecafluoroheptanol, methanol, n-butanol, n-octanol, 2-methoxyethanol, 2-(n-butoxy)ethanol, phenol, 3- or 4-chlorophenol, 4-bromophenol, 4-methoxyphenol, 4-(n-butoxy)phenol, 4-phenylphenol, 4-phenoxyphenol, benzyl alcohol, 2-(N-methylamino)ethanol, 2-(N-ethylamino)ethanol, 3-(N-methylamino)propanol, 3 - (N-ethylamino)propanol, 4-aminobenzyl alcohol, 3 - aminobenzyl alcohol, 4 - (aminomethyl)phenol, 3 - amino-phenol, 4 - aminophenol, and 4-amino-m-cresol, and N-β-hydroxy-ethyl-piperazine may be employed. Reaction temperatures are in the range of 0° to 200° C. and above, but are preferably in the range of 20° to 150° C.

The above polyers may be prepared by the following procedure instead of that described above: a polyphosphazene homopolymer or copolymer is reacted with an alkali metal salt of an aminoalcohol. Thereby, the aminoalkoxy moiety is introduced onto the polyphosphazene in amounts of 0.5 to 35 mole percent. Higher concentrations of these groups may be introduced but at sacrifice to the outstanding properties normally associated with the polyphosphazenes.

Polymers prepared by either of the two aforementioned processes may be isolated and recovered by known procedures. They may be formulated into crosslinkable systems with isocyanate, anhydride, or epoxide reagents by physical blending or by solution techniques. Catalysts may also be present to accelerate this curing reaction. Tertiary amines such as trialkylamines, triethylenediamine, N-alkylated derivatives of piperidine, morpholine or piperazine, and tris-2,4,6-(N,N-dimethylaminomethyl)phenol, metal salts, and metal alkyl halides are representative of suitable catalysts. The amount of catalyst used will generally be 0.1 to 5% by weight on polyphosphazene, 0.5 to 2% being preferred.

The following are representative curing agents suitable in this invention:

1-chloro-2,4-phenylene diisocyanate
m-phenylene diisocyanate
p-phenylene diisocyanate
4,4'-diphenylmethane diisocyanate
2,4-toluene diisocyanate
3,3'-dimethyl-4,4'-biphenylene diisocyanate
3,3'-dimethyl-4,4'-diphenylmethane diisocyanate
3,3'-dimethoxy-4,4'-biphenylene diisocyanate
2,2',5,5'-tetramethyl-4,4'-biphenylene diisocyanate
2,4-/2,6-toluene diisocyanate (80/20)
4,4'-biphenylene diisocyanate
3,3'-dichlorobiphenylene diisocyanate
α,α'-xylene diisocyanate
vinylene diisocyanate
polymethylene polyphenylisocyanate
1,6-hexane diisocyanate
pyromellitic dianhydride
3,3',4,4'-benzophenone tetracarboxylic dianhydride
bis(3,4-dicarboxyphenyl)ether dianhydride
2,2-bis(3,4-biscarboxyphenyl)propane dianhydride
1,2,4,5-cyclohexane tetracarboxylic dianhydride
vinylcyclohexene dioxide
butadiene diepoxide
1,2,7,8-diepoxyoctane
3-(3,4-epoxycyclohexane)-8,9 - epoxy - 2,4 - dioxaspiro [5.5]-undecane
3,4-epoxycyclohexylmethyl 3,4 - epoxycyclohexane carboxylate
bis(2,3-epoxycyclopentyl)ether
bis(3,4-epoxy-6-methylcyclohexylmethyl)adipate Di- and poly-glycidyl derivatives of the following:

4,4'-methylenediphenol
4,4'-isopropylidine(2,6-dibromophenol)
4,4'-isopropylidine(2,6-dichlorophenol)
resorcinol
hydroquinone
1,1,2,2-tetra(p-hydroxyphenyl)ethane
p-aminophenol
phenol-formaldehyde novalac
1,4-butanediol
1,1,3-tris(p-hydroxyphenyl)propane Polymers derived from glycidyl acrylate or methacrylate
This list is intended for purposes of illustration only and is not intended to be all inclusive.

The amount of curing agent will generally vary from 2 to 50% by weight on polyphosphazene and is determined by the functionality and molecular weight of both the polyphosphazene and the curing agent itself. The preferred ratio of reactive group of curing agent to amino group of the polyphosphazene is 1.0 to 1.1.

The crosslinking reaction may be performed at ambient or elevated temperatures. For example, a phosphazene terpolymer derived from trifluoroethanol (45 mole percent), 2,2,3,3,4,4,5,5-octafluoropentanol (45 mole percent) and 2-(N-methylamino)ethanol (10 mole percent) when dissolved in tetrahydrofuran can be crosslinked within minutes at room temperature in the presence of 2,4-toluene diisocyanate and dibutyltin diacetate catalyst. The same polymer can be crosslinked with diepoxides but longer times and/or higher temperatures are required. Systems which crosslink more slowly are particularly useful for solvent based coatings and solvent-free sealant and potting compositions. With these compositions the formulation is applied to the desired substrate or form and subsequently crosslinked in place upon standing and/or by application of heat. Crosslinking reactions are often run in the presence of inert, reinforcing or other fillers and the presence of these additives should in no way be construed as falling outside the scope of this invention.

The ability to be cured at room temperature makes these copolymers and terpolymers particularly useful as potting and encapsulation compounds, fuel tank sealants, coatings and the like. In these applications room temperature cures are particularly desirable.

This invention is further illustrated by reference to the following examples which are not intended to limit the scope of this invention.

EXAMPLE 1

Synthesis and curing of $[(CF_3CH_2O)_2PN—(C_3F_7CH_2O)_2PN$
$—(4NH_2C_6H_4O)_2PN]_n$ terpolymer The alkoxides of 1,1,1-trifluoroethanol (0.50 mole), 2,2,3,3,4,4,4-heptafluorobutanol (0.50 mole) and N-(4-hydroxyphenyl)propionamide (0.01 mole) were prepared by reaction with sodium (0.98 mole) in dry tetrahydrofuran. Soluble $[Cl_2PN]_n$ polymer (0.45 mole) was dissolved in 500 ml. benzene and added dropwise to the alkoxides at a rate which maintained reflux. The reaction mixture was refluxed for 24 hours, resulting in the formation of the terpolymer

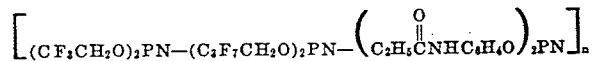

The solids were placed in contact with water, then dissolved in an azeotropic mixture of $CCl_2FCClF_2$ and acetone and washed with dilute alcoholic alkali, whereupon the hydrolysis of the

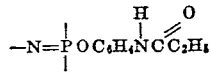

linkage to

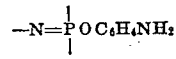

was accomplished. Upon precipitation into benzene, this polymer was obtained as a colorless elastomer. An intrinsic viscosity of 1.2 dl./g. in $F[CF(CF_3)CF_2O]_2$—$CHFCF_3$ was found. Anal. calculated for 1:1:0.02

$[(CF_3CH_2O)_2PN$—$(C_3F_7CH_2O)_2PN$
—$(NH_2C_6H_4O)_2PN]_n$:
C, 21.2; H, 1.2; N, 4.1. Found: C, 21.1; H, 1.2; N, 4.1.

The polymer was insoluble in all common organic solvents, but was soluble in selected fluorocarbon solvents. When a solution of polymer (1 g. in 5 ml. $CCl_2FCClF_2$/acetone azeotrope) was treated with 1,3-phenyl diisocyanate (0.1 g.) at room temperature, the polymer crosslinked and was rendered insoluble in common organic and fluorocarbon solvents.

The title terpolymer was also prepared with the amount of —NH functionality varying from 1 to 35 mole percent by using initial quantities of 0.01 to 0.15 mole, respectively, of

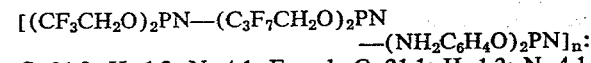

and decreasing the amounts of sodium fluoroalkoxides accordingly. Terpolymers containing 1–5 mole percent of —NH functionality were conveniently crosslinked by using polymethylene polyphenylisocyanate in the presence of dibutyltin diacetate catalyst. Polymers with higher concentrations of —NH could be easily crosslinked by using polymethylene polyphenylisocyanate or toluene diisocyanate.

EXAMPLE 2

Synthesis and curing of $[(CF_3CH_2O)_2PN$—$(C_3F_7CH_2O)_2PN$
—$(NH_2C_3H_6O)_2PN]_n$ terpolymer This terpolymer was prepared as described in Example 1 except 0.03 mole N-(3-hydroxy-n-propyl)acetamide was substituted for N-(4-hydroxyphenyl)propionamide. The resulting

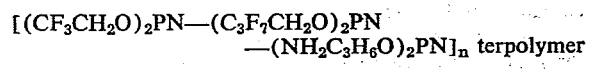

terpolymer was hydrolyzed to form $[(CF_3CH_2O)_2PN$—$(C_3F_7CH_2O)_2PN$
—$(NH_2C_3H_6O)_2PN]_n$.

This terpolymer had an intrinsic viscosity of 1.4 dl./g. in $F[CF(CF_3)CF_2O]_2CHFCF_3$.

Anal. calculated for 1:1:0.06

$[(CF_3CH_2O)_2PN$—$(C_3F_7CH_2O)_2PN$
—$NH_2C_3H_6O)_2PN]_n$:

C, 21.2; H, 1.3; N, 4.1. Found: C, 21.2; H, 1.4; N, 4.1.

The terpolymer was soluble in selected fluorocarbon solvents, but became insoluble after cure. Cures were accomplished at room temperature by allowing a solution of polymer (1 g. in 7 ml. $CCl_2FCClF_2$/acetone azeotrope) to stand overnight with methyl ethylene-bis(urethane)

(0.1 g.) and triethylene diamine (0.01 g.). Similarly, diacids and diacid chlorides were successful in crosslinking the terpolymer but acidic compounds or acidic by-products in these cases are less desirable than the by-product alcohol produced above.

EXAMPLE 3

Preparation and cure of a terpolymer of $[(CF_3CH_2O)_2PN$—$(C_3F_7CH_2O)_2PN$—
$(CH_3CH_2NHCH_2CH_2O)_2PN]_n$ An alkoxide mixture was prepared in 400 ml. of tetrahydrofuran from sodium (10.1 g., 0.44 mole), $CF_3CH_2OH$ (18.0 g., 0.18 mole), n-$C_3F_7CH_2OH$ (36.0 g., 0.18 mole), and 2-ethylaminoethanol (16.0 g., 0.18 mole). The mixture was stirred overnight and refluxed for 3 hours. Over a period of 1.5 hours $[Cl_2PN]_n$ polymer (23.2 g., 0.20 mole) in 330 ml. of benzene was added to the light yellow alkoxide mixture at reflux. Reflux was continued for ½ hour and then the mixture was stirred overnight at room temperature. Liquids were decanted and the solid was washed with water. The terpolymer was dissolved in 600 ml. of Freon TA ($CCl_2FCClF_2$/acetone, 89/11 azeotrope by weight), and washed with water until the aqueous layer was free of chloride ion. The terpolymer was isolated by precipitation into benzene and the procedure was repeated a second time. The polymer had an intrinsic viscosity of 0.55 dl./g. in Freon TA at 28° C. Anal. calculated for the title terpolymer which contains 10 mole percent of $C_2H_5NHC_2H_4O$: C, 22.5; H, 1.7; N, 5.1; Cl, 0.0. Found: C, 22.2; H, 1.7; N, 5.6; Cl, 0.3.

A solution of the above terpolymer (10%) in $(CCl_2FCClF_2)$/acetone (1 v./1 v.) was treated with DDI (an aliphatic diisocyanate; 15% by weight on polymer) or 2,4-toluene diisocyanate (TDI; 8% on polymer) at room temperature in the presence of dibutyltin diacetate (1% on polymer). The samples were retained in solution in closed containers and observed periodically. The data are summarized in Table I.

TABLE I

Room Temperature Cures of a $[(CF_3CH_2O)_2PN$—$(C_3F_7CH_2O)_2PN$—$(C_2H_5NHC_2H_4O)_2PN]_n$ Terpolymer

| Cure mixture terpolymer (0.5 g.) in solution | | Catalyst(a) (microliters) | Time of observation (hrs.) | Remarks |
|---|---|---|---|---|
| TDI (g.) | DDI (g.) | | | |
| 0.15 | | None | 1 | Slight cure. |
| | | | 240 | Do. |
| 0.15 | 1.5 | | 2 | Moderate cure. |
| 0.1 | 10 | | 2 | Do. |
| 0.2 | 20 | | 2 | Do. |
| 0.05 | | 5 | 2 | Tightly cured and clear in bulk form. |
| 0.08 | | 8 | 2 | Tight cure. |
| 0.1 | | 10 | 2 | Do. | a Dibutyltin diacetate.

The polymer could also be cured with TDI and dibutyltin diacetate catalyst as a coating as follows: A glass sheet was coated with a solution of the polymer and solvent was allowed to evaporate. When the film was slightly tacky a small amount of a solution of TDI and dibutyltin diacetate was sprayed over it. Further drying led to a crosslinked coating.

EXAMPLES 4–17

Following the procedure of Example 3, using the indicated alcohols and reaction conditions, the corresponding co- and terpolymers of Examples 4–17 were prepared. When reaction temperatures in excess of 70° C. were employed, bis(2-methoxyethyl)ether and chlorobenzene were used as solvents for the alkoxides and $[Cl_2PN]_n$ polymer, respectively. All the polymers were found to be curable with TDI. The polymer of Example 5 could also be cured by heating with 3,3′,4,4′-benzophenone tetracarboxylic dianhydride or vinylcyclohexene dioxide.

| Example | Alcohol(s) | Moles | Aminoalcohol | Moles | Reaction conditions °C. | Hours |
|---|---|---|---|---|---|---|
| 4 | $CF_3CH_2OH$ | (0.36) | 2-(N-methylamino)ethanol | (0.1) | 70 | 1 |
| 5 | $CF_3CH_2OH$ / $C_3F_7CH_2OH$ | (0.18) / (0.18) | 2-aminoethanol | (0.15) | 70 | 1 |
| 6 | $H(CF_2)_4CH_2OH$ / $C_3F_7CH_2OH$ | (0.20) / (0.10) | 2-(N-ethylamino)ethanol | (0.12) | 70 | 1 |
| 7 | $CF_3CH_2OH$ / $H(CF_2)_6CH_2OH$ | (0.20) / (0.10) | 2-(N-methylamino)ethanol | (0.15) | 70 | 6 |
| 8 | $CF_3CH_2OH$ / $CH_3OH$ | (0.18) / (0.18) | 4-aminobenzyl alcohol | (0.12) | 70 | 6 |
| 9 | $4\text{-}ClC_6H_4OH$ | (0.40) | 4-aminomethylphenol | (0.06) | 125 | 25 |
| 10 | $H(CF_2)_4CH_2OH$ / $CH_3OC_6H_4OH$ | (0.18) / (0.18) | N-(β-hydroxyethyl)-piperazine | (0.15) | 70 | 6 |
| 11 | $CF_3CH_2OH$ / $C_6H_5OH$ | (0.18) / (0.18) | 2-(N-methylamino)ethanol | (0.1) | 100 | 15 |
| 12 | $CH_3OH$ | (0.36) | do | (0.1) | 70 | 10 |
| 13 | $n\text{-}C_5H_{11}OH$ | (0.36) | do | (0.1) | 70 | 24 |
| 14 | $CH_3OC_2H_4OH$ | (0.36) | N-(β-hydroxyethyl)-piperazine | (0.1) | 70 | 24 |
| 15 | $4\text{-}(n\text{-}C_4H_9O)C_6H_4OH$ | (0.36) | 3-aminophenol | (0.1) | 125 | 30 |
| 16 | $4\text{-}C_6H_4OC_6H_4OH$ | (0.36) | do | (0.1) | 125 | 30 |
| 17 | $C_6H_5CH_2OH$ | (0.36) | do | (0.1) | 70 | 20 |

*Followed by stirring overnight at room temperature.

EXAMPLE 18

Preparation of the terpolymer of Example 3 via $[(CF_3CH_2O)_2PN\text{—}(n\text{—}C_3F_7CH_2O)_2PN]_n$ (1:1 copolymer A solution of the sodium salt of 2-(N-ethylamino)-ethanol was prepared from 1.8 g. 2-(N-ethylamino)ethanol (0.02 mole) and 0.12 g. sodium (0.005 mole) in 20 ml. dry tetrahydrofuran. The sodium alkoxide was added to a solution of 3.43 g.

$$[(CF_3CH_2O)_2PN\text{—}(n\text{—}C_3F_7CH_2O)_2PN]_n$$

(1:1) copolymer (0.01 mole) in 70 ml. of $$F[CF(CF_3)CF_2O]_2CHFCF_3/dioxane$$

(5 v./2 v.). The reaction was stirred overnight at room temperature and then heated for 3 hours at 70° C. Terpolymer was precipitated upon addition of methanol and was isolated as described in Example 1. The product (3.2 g.) was a yellowish weak rubbery solid which had an intrinsic viscosity of 0.72 dl./g. in $$F[CF(CF_3)CF_2O]_2CHFCF_3$$

at 30° C. The initial copolymer had an intrinsic viscosity of 0.79 dl./g. Analysis of product was essentially the same as that described in Example 3. Crosslinking was effected with 2,4-toluene diisocyanate.

Similarly, a terpolymer with an intrinsic viscosity of 0.20 dl./g. was prepared. This material was quickly mixed with TDI and dibutyltin diacetate catalyst and poured into an open mold. Upon standing a crosslinked elastomeric mass was produced. This same mixture was also useful as a sealant upon crosslinking.

EXAMPLES 19–23

In a manner similar to that described in Example 18, but using the homopolymers and copolymers indicated below, the corresponding amine containing copolymers and terpolymers were obtained by reaction at 70–95° C. All the products were crosslinked by reaction with 2,4-toluene diisocyanate.

| Ex. | Starting polymer |
|---|---|
| 19 | $[(CF_3CH_2O)_2PN]_n$ |
| 20 | $[(H(CF_2)_2CH_2O)_2PN]_n$ |
| 21 | $[(CF_3CH_2O)_2PN\text{-}(H(CF_2)_4CH_2O)_2PN]_n$ |
| 22 | $[(CF_3CH_2O)_2PN\text{-}(C_6H_5O)_2PN]_n$ (1:1) |
| 23 | $[(4\text{-}ClC_6H_4O)_2PN]n$ |

What is claimed is:

1. Polyphosphazenes the skeletal chains of which comprise randomly repeating units represented by the general formulas

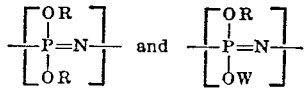

wherein each R is a monovalent radical selected from the group consisting of alkyl, fluoroalkyl, aryl, substituted aryl and arylalkyl and not every R in the polyphosphazene is required to be identical to every other R; and each W is a monovalent group containing —NH or —$NH_2$ functionality, and wherein W is selected from the group which consists of

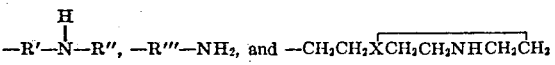

wherein R' is $(\text{—}CH_2\text{—})_a$ or $\text{—}C_6H_4(CH_2)_a$ wherein $a$ is an integer from 1 to 4, and wherein X represents CH or N, R" represents lower alkyl with up to 4 carbon atoms; R''' represents alkyl, aryl, aralkyl, alkylaryl, and the aryl group is carbocyclic or heterocyclic; and the ratio of R/W is from about 99.5/0.5 to 65/35.

2. A curable composition comprising the polymers of claim 1 and a curing agent in an amount sufficient to cure said polymer at room temperature or above, and selected from the group consisting of polyisocyanates, polyanhydrides and polyepoxides.

3. A cured polyphosphazene prepared by curing the composition of claim 2 with a polyisocyanate.

4. A cured polyphosphazene prepared by curing the composition of claim 2 with a polyanhydride.

5. A cured polyphosphazene prepared by curing the composition of claim 2 with a polyepoxide.

6. The polymers according to claim 1 in which up to 35 mole percent of the groups attached to the P atoms contain —NH functionality.

7. The polymers of claim 1 where R is selected from the group which consists of $F(CF_2)_nCH_2$— and $$H(CF_2)_mCH_2\text{—}$$

where $m$ and $n$ are integers from 1 to 8.

8. A curable composition comprising the polymers of claim 1 wherein R is selected from the group consisting of $F(CF_2)_nCH_2$— and $H(CF_2)_mCH_2$—, wherein $m$ and $n$ are integers from 1 to 8, and a curing agent selected from the group consisting of polyisocyanates, polyanhydrides and polyepoxides, said curing agent being present in an amount by which the polymers can be crosslinked at room temperature or above.

9. A cured polyphosphazene prepared by curing the composition of claim 8.

References Cited

UNITED STATES PATENTS 3,515,688   6/1970   Rose _____ 260—2 P

CHRISTOPHER A. HENDERSON, Primary Examiner

U.S. Cl. X.R.

260—77.5, 830 R, 838